(12) United States Patent
Weinblatt

(10) Patent No.: US 12,346,928 B1
(45) Date of Patent: Jul. 1, 2025

(54) METHOD FOR DELIVERING TARGETED MESSAGES AND CONTENT AUTOMATICALLY TO SPECIFIC AUDIENCES

(71) Applicant: Lee S. Weinblatt, Teaneck, NJ (US)

(72) Inventor: Lee S. Weinblatt, Teaneck, NJ (US)

( * ) Notice: Subject to any disclaimer, the term of this patent is extended or adjusted under 35 U.S.C. 154(b) by 0 days.

(21) Appl. No.: 18/678,964

(22) Filed: May 30, 2024

(51) Int. Cl.
  *G06Q 30/00* (2023.01)
  *G06Q 30/0226* (2023.01)
  *G05B 19/418* (2006.01)

(52) U.S. Cl.
  CPC ............... *G06Q 30/0226* (2013.01)

(58) Field of Classification Search
  CPC .................................. G06Q 30/0226
  See application file for complete search history.

(56) References Cited

U.S. PATENT DOCUMENTS

| | | | |
|---|---|---|---|
| 9,449,334 B1 | 9/2016 | Abou-Rizk et al. | |
| 2003/0144017 A1* | 7/2003 | Inselberg | A63F 13/12 455/517 |
| 2004/0122735 A1* | 6/2004 | Meshkin | G06Q 30/0265 705/14.62 |
| 2016/0012807 A1* | 1/2016 | Neuhauser | G10H 1/0008 704/211 |
| 2017/0201779 A1* | 7/2017 | Publicover | H04N 21/4532 |
| 2020/0275147 A1 | 8/2020 | Pizzurro et al. | |
| 2022/0261853 A1 | 8/2022 | Publicover | |

OTHER PUBLICATIONS

"Word of mouth mobile marketing for real world recommendations". IEEE. 2010. (Year: 2010).*
"Consumer Devices Get Smart". IEEE. 2015. "Consumer Devices Get Smart". IEEE. 2015. (Year: 2015).*

* cited by examiner

*Primary Examiner* — Maria V Vanderhorst
(74) *Attorney, Agent, or Firm* — Howard Natter

(57) ABSTRACT

A method for delivering targeted marketing content to loyalty app users wherein unique scene-relevant codes reflecting the nature of the marketing content at that moment in time, are permanently embedded within the marketing content. The loyalty apps are automatically upgraded to receive codes, enabling the scene-relevant codes to be received by the loyalty app user's smartphone which then activates the matching loyalty apps. The selected apps then review the app user's history and preferences and decide if an offer, content, or reward should be made by notification to the app user while not revealing the identity of the app user.

10 Claims, 2 Drawing Sheets

METHOD FOR DELIVERING TARGETED MESSAGES AND CONTENT AUTOMATICALLY TO SPECIFIC AUDIENCES

BACKGROUND OF THE INVENTION

Field of the Invention

This invention relates generally to a system and method for delivering targeting marketing content, including offers and other information, to a specific viewing or listening audience while maintaining audience privacy.

Description of Related Art

There are currently several techniques for delivering advertising to selected audiences. One existing method is broadcast advertising, such as via radio or television, to those members of the public that happen to be listening to or viewing that medium. A limitation of this technique is that it is selective only in so far as the programming is known to attract an audience of a particular demographic, such as through surveys. Another problem with ads placed upon general mass demographic data rather than specific viewers is that the ads are generally of little interest or are inappropriate to most viewers.

Other Internet techniques for targeted marketing include: "pop-up" commercials directed to specific viewers and based on browsing history; cable TV targeted ads based upon stored viewer information; apps that provide customized offers based upon prior customer history; and apps that are activated by audio/digital codes hidden in content. A problem with those targeted ads is that they are stored in cable servers/boxes and released to target audiences at certain time-period program slots and not during specific scene content. Also, these methods disregard the fact that an associated scene content may impact on a viewer's desire for a specific offer or product.

Another short-coming of stored commercials is that they take up a large amount of broadcaster disc storage and are consequently erased after a short period of time because of storage costs. Alternatively, each stored commercial is time sensitive and campaign sensitive and must be constantly updated.

A further problem with previously known targeted commercials is that they are not viewer-specific, as viewership data is based on household viewing habits, not individual viewer data. Another disadvantage of the prior mentioned targeted ads is that the advertisers have no control as to how many viewers respond to an offer or ad, with the possibility of overwhelming campaign budgets and supplies.

Furthermore, with regard, to current restrictions placed on the use of "cookies" and the option for many users to "opt out" of the sharing of personal information, it has become more difficult for advertisers to effectively deliver targeted messages using the above-described methods.

Additionally, a shortcoming of traditional TV, delivered by cable or satellite, for reaching desired audiences, has been traditional media's loss in viewership. Today more audiences are watching streaming and Internet content than are watching traditional TV broadcasting. Also, because of the voluminous content choices now available, it is extremely difficult for an advertiser to select the most appropriate time and media to communicate with large audiences. Additionally, most "premium" streaming channels offer "ad-free" viewing, further limiting the access for advertisers to reach desired audiences.

Another limitation of many ad campaigns is that the ads are not placed within appropriate program content. Numerous studies have found that when placed within appropriate content ads are remembered better, have higher likeability and more follow-up purchase. For example, it has been found that golf club ads have higher impact when shown during golf TV shows and investment ads have more persuasion when placed within stock market/financial news segments. However, finding the right content to encode for presentation at a specific time is extremely difficult or nearly impossible in view of the numerous new forms of content, such as streaming videos, podcasts etc. Furthermore, advertisers cannot afford to place ads on multiple content streams and must guess which ones will be viewed by target audiences and at what times. The use of apps may provide a solution to the above, however, this would only work if viewers would be willing to download multiple apps which would be impractical because having multiple apps running at the same time on a smart device would burn-up the battery and overwhelm digital flow.

Although a system for delivering targeted ads in broadcast media based on viewer interest is disclosed in U.S. Published Patent Applications Nos. 2020/0275147 and 2014/0304068 and in U.S. Pat. No. 9,124,916 a problem with many of these systems is that the same ads would appear continuously on the same program content unless a consumer profile was used to know which program content version to deliver. Besides, the expense of inserting different ads would be considerable as would the need to have many different content providers to store multiple targeted messages, see for example U.S. Pat. No. 9,449,334.

BRIEF SUMMARY OF THE INVENTION

Briefly, this invention concerns, a method for delivering targeted marketing content to an audience of smart device users, such as smartphones, tablets, P.C.s, or laptop computers having loyalty apps installed wherein unique undetectable scene relevant codes reflecting the nature of the marketing content at every second in time or at special moments are permanently embedded within the marketing content. The codes are unique for appropriate segments of the marketing content. The loyalty app users automatically upgrade to a code-detecting platform on their smartphones to enable the scene relevant codes to recognize and activate the loyalty apps having matching categories of marketing content. After activation the loyalty app will then review the app user's history and preferences and decide if an offer, content, or reward should be made by notification to the app user while safeguarding the user's privacy.

It is a feature of this invention that while the offer, content, or reward is being made, the content provider and corresponding business being served by the loyalty app user, have no knowledge of who is receiving the offer, and no confidential information is shared thus maintaining the privacy of the loyalty app user. Only if the loyalty app user desires to accept the offer, is there a limited connection between the content provider and the business being served, with the loyalty app user.

Since the scene-relevant marketing content being viewed by the loyalty app user is coded to match different categories of user preferences, there is a greater chance that the content will be appropriate to the user, will be remembered better by the user, and will have a higher impact, especially since an offer or push notification will appear on the loyalty app user's smartphone almost simultaneously with or a short time after the user's viewing or hearing of the content.

Another feature of this invention is that the loyalty app user can limit the number of offers received by declining offers and/or by deleting selective loyalty apps.

Yet another feature of this invention is that the scene-relevant marketing content can be selected and automatically presented to the audience with appropriate consideration for the viewers' age, sex, location, and purchase history as previously downloaded by the loyalty app user. Furthermore, by using loyalty apps to deliver the marketing content only to those watching approved encoded content there is no risk of receiving wrong or offensive content.

Still yet a further feature of this invention is that the audience can control the types of products or services for which they receive offers, discounts, rewards, etc. even before they are presented by limiting or restricting the number and types of loyalty apps on the users' smartphone.

The above mentioned are but some of the advantages and improvements of the present invention, that overcome many of the limitations, deficiencies and shortcomings of the currently used methods for delivering marketing messages to consumers over the Internet.

The foregoing is a summary and thus contains, by necessity, simplifications, generalizations and omissions of detail, consequently, those skilled in the art will appreciate that the summary is illustrative only and is not intended to be in any way limiting. Other aspects, features, and advantages of the devices and/or processes and/or other subject matter described herein will become apparent in the teachings set forth herein.

BRIEF DESCRIPTION OF THE DRAWINGS

The above and/or other aspects and advantages will become more apparent and more readily appreciated from the following detailed description of embodiments of the invention taken in conjunction with the accompanying drawings of which.

DETAILED DESCRIPTION OF THE INVENTION

With specific reference now to the drawings, it is stressed that the particulars shown are by way of example and for the purpose of illustrative discussion of the present invention and are presented in the cause of providing what is believed to be the most useful and readily understood description of the principles and conceptual aspects of the invention. In this regard no attempt is made to show aspects of the invention in more detail than is necessary for the fundamental understanding of the invention, the description taken with the drawings making apparent to those skilled in the art how the invention may be embodied in practice.

Figure 1:
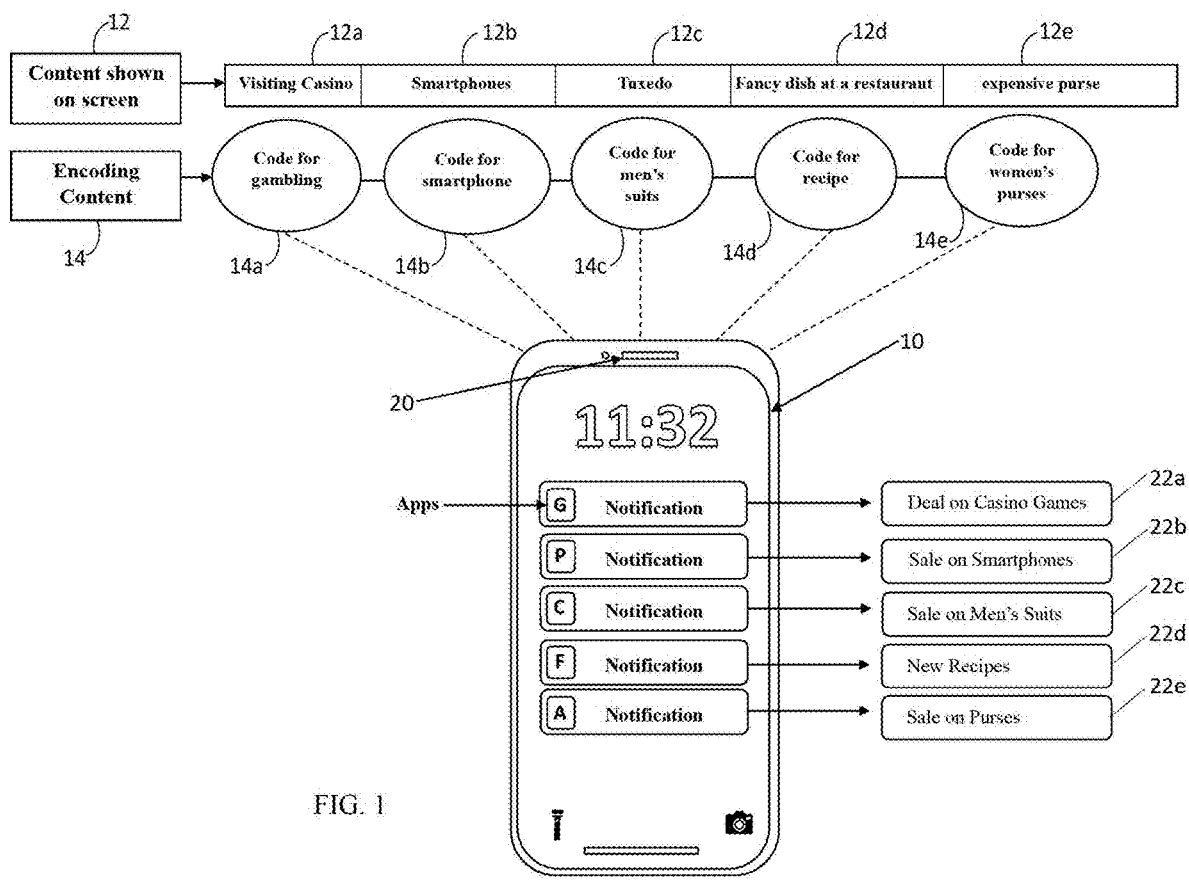
FIG. 1 is a pictorial representation of a smartphone in combination with a schematic drawing illustrating the operation of the invention.

Referring now to FIG. 1, there is shown a pictorial representation of a smartphone 10, in combination with a schematic illustrating, by way of example, the elements of the system of the present invention. The term "smartphone" is used herein in its broadest sense and can be any type of "smart device" having similar capabilities. The term "loyalty apps" as used herein refers to software applications sponsored by businesses such as those that offer transactional advantages directly tied to product or service purchases and are designed to reward and encourage customer loyalty. Loyalty apps are usually integrated with the point-of-sale systems of the businesses they serve. The loyalty apps collect and analyze data on customer behavior, preferences, and transaction history for businesses to understand their customers better and to customize their promotions.

The operation of the invention will be further discussed in connection with the delivery of marketing content contained within a motion picture or movie 12 that is broadcast to an audience for on-air, online, or live viewing. The members of the audience each have a smartphone 10 with downloaded loyalty apps, denoted G, P, C and F and A. The respective loyalty apps are each related to a respective category of products or services offered by the businesses that they serve. For the purposes of this description, "G" represents a category of gaming devices; "P" represents a category of phone devices; "C" represents a category of articles of clothing; "F" represents a category of food recipes and "A" represents a category of articles of clothing.

The movie 12 contains specific scene-relevant marketing content designated 12a, 12b, 12c, 12d, and 12e. The respective scene 12a, for example, shows a visit to a casino; 12b shows a display of smartphones; 12c shows a man wearing a tuxedo; 12d shows a fancy dish at a restaurant; and 12e shows a woman carrying an expensive purse. The respective designated content 12a-12e, is encoded before being broadcast, as shown at 14, with specific and preferably permanent embedded category codes namely, for: gambling 14a; smartphones 14b; men's suits 14c; recipes 14d; women's purses 14e, with each code category corresponding to the actual content (12a-12e) being portrayed or referred to at that moment.

The content category codes (14a-14e) have an exceptionally short audio signal imbedded in the audio content and placed at time intervals of every second or at special moments. The embedded audio signal can be one of the following: a signal in the high frequency range of sound hidden in the audio content; an audible signal hidden or embedded within other loud audible content; or a digital signal (bits) hidden within the actual content audio spectrum. The use of hidden codes has been more fully described in U.S. Pat. Nos. 9,554,092 and 10,015,534 and is hereby incorporated herein by reference.

The use of digital signals within the audio would be the transmission choice if the audience member is, for example, wearing headphones, while watching the movie 12 or listening to a radio program since the audio signals with the content category code, would otherwise not be received by the smartphone 10. It should be further noted that the content category codes (14a-14e) are preferably permanently imbedded in the audio channel of the movie 12, to appear whenever and wherever the movie 12 is accessed, with the responding reward/offer/content/discount being determined later, as will be discussed hereinafter. Additionally, noted is that the codes are universal, don't require duplicate media formats, are timeless, take up very little media space and require no knowledge of who receives them.

Figure 2:
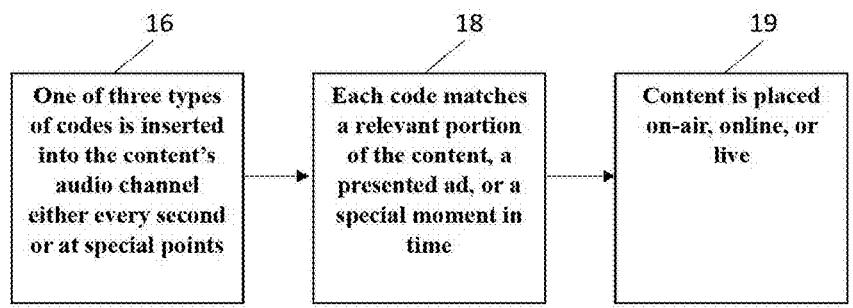
FIG. 2 is a flow-chart detailing the steps of encoding the content.

A flow chart further describing the steps of encoding and broadcasting the content is shown in FIG. 2 attached hereto. As noted therein at 16, one of the three types of audio codes, mentioned above, is inserted into the content audio channel either at timed intervals or at scene-relevant moments. Each code matches a relevant portion of the content, a particular advertisement appearing in the content, or a special moment in time, as noted at 18. The content is then broadcast on-air, online, or live, as denoted at 19.

Further as shown in FIG. 1, when the smartphone is activated, the microphone is open to receive the embedded audio codes (14a-14e) transmitted wirelessly to a microphone receiving/code detection platform 20. Concurrently, the loyalty app users upgrade their existing loyalty apps (G, P, C, F, and A) for activation by the respective audio codes. All of the upgraded loyalty apps share the same code detection platform 20 although they may have different loyalty reward programs. When a detected audio code corresponds to a loyalty app category, it will activate that particular loyalty app. The loyalty app will then be able to access the user's history and/or preferences to select an appropriate reward, content or points and send a notification to the app user. By way of example, typical push notifications are shown in FIG. 1 as 22a, "deal on casino games"; 22b, "sale on smart phones"; 22c, "sale on men's suits"; 22d, "new recipes"; and 22e, "sale on purses". The loyalty app user can then accept or decline the offers, rewards, etc.

Figure 3:
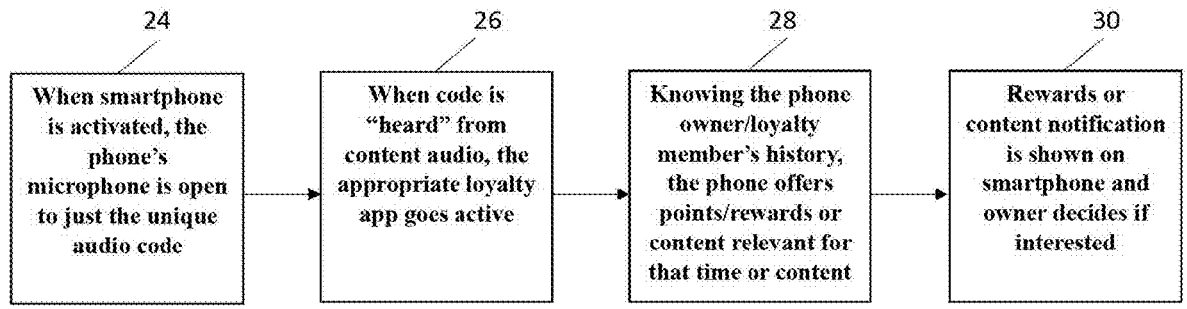
FIG. 3 is a flow-chart describing the steps of receiving the code and activating the offer.

A flow chart further describing receiving the code and activating the offer is noted in FIG. 3. The embedded code is received in the smartphone's open microphone at 24. The upgraded loyalty app detects the code and becomes active, at 26. That particular app user's purchase history and preferences become available for offering content notifications, rewards, etc. as noted at 28, and 30.

This invention also provides a method to compensate the content builders (providers) and the content distributors (broadcasters). In addition to the scene-relevant category codes, digital ID code are added to the content to identify the content builder and the broadcaster. When the loyalty app user receives a notification and clicks on an offer/content/reward, the advertiser is charged an agreed price for each click payable to the content builder and the broadcaster.

Having thus described the invention there is claimed as new and desired to be secured by Letter Patent:

1. A method for delivering targeted marketing content to an audience of at least one loyalty app user having a smart device with downloaded loyalty apps and a microphone receiving/code detection platform while maintaining audience privacy, comprising the steps of:
   a. permanently embedding the marketing content with scene-relevant category codes reflecting appropriate segments categories in of the marketing content;
   b. broadcasting the marketing content to an audience of at least one loyalty app user by at least one of the following modalities: on-air, online, or live wherein a respective scene-relevant category code is transmitted within at least one of an audio and digital spectrum whenever corresponding marketing content having a matching category is being broadcast;
   c. activating the smart device for receiving the scene-relevant category codes;
   d. transmitting the scene-relevant category codes to the microphone receiving/code detection station platform in the smart device;
   e. upgrading the loyalty apps in the loyalty app user's smart device wherein the scene-relevant category codes recognize and activate the loyalty apps in the loyalty app user's smart device, having matching categories of marketing content;
   f. accessing utilizing the activated loyalty apps for reviewing the user's personal purchase history and preferences, and selecting at least one of an appropriate offer, reward, and content that may be of interest to the user; and
   g. sending a push notification of the selection, to the loyalty app user without revealing the identity of the app user wherein the notification is receivable at the time the marketing content with the corresponding scene-relevant code is being broadcast and will thus have a higher impact on the user;
   h. wherein the user can optionally accept an offer with a limited connection between the app user and the business offering the goods and services.

2. The method as claimed in claim 1 wherein the marketing content is permanently embedded with codes that are unique for the appropriate segments of the marketing content.

3. The method as claimed in claim 1 wherein the scene relevant scene-relevant codes are permanently hidden within the audio spectrum of the marketing content.

4. The method as claimed in claim 1 wherein the marketing content is encoded by at least one of an ultra-high frequency code, an audible but hidden code within other loud audible marketing content, and a digital code.

5. The method as claimed in claim 1 wherein the scene-relevant category codes include at least one of the following: a relevant portion of the content, a particular advertisement appearing in the content, and a special moment in time.

6. The method as claimed in claim 1 wherein a plurality of loyalty apps share the same microphone receiving/code detection platform.

7. The method as claimed in claim 1 wherein the smart device is a smartphone, at least one of the following: a smartphone, a tablet, a P.C, (personal computer), or a laptop computer.

8. The method as claimed in claim 1 wherein the marketing content is broadcast by at least one of the following: visual transmission and audible transmission.

9. The method as claimed in claim 1 wherein the scene-relevant category codes are permanently embedded in the marketing content and will activate the corresponding upgraded loyalty app whenever the scene-relevant content is broadcast.

10. The method as claimed in claim 1 wherein the loyalty app user can selectively predetermine the number of push notifications desired to be received by blocking future notifications from non-desired sources.

* * * * *

UNITED STATES PATENT AND TRADEMARK OFFICE
CERTIFICATE OF CORRECTION

PATENT NO. : 12,346,928 B1  
APPLICATION NO. : 18/678964  
DATED : July 1, 2025  
INVENTOR(S) : Lee S. Weinblatt Page 1 of 1

It is certified that error appears in the above-identified patent and that said Letters Patent is hereby corrected as shown below:

In the Claims

In Claim 1:

Column 5, Line 45, reading "segments categories in of the marketing content" should read: --categories of the marketing content--.

Column 5, Line 49, reading "respective scene-relevant category code is transmitted" should read: --respective scene-relevant category code will be transmitted--.

Column 5, Line 55, reading "microphone receiving/code detection station platform" should read: --microphone receiving/code detection platform--.

Column 6, Line 6, reading "accessing utilizing the activated loyalty apps for" should read: --utilizing the activated loyalty apps for--.

Column 6, Line 10, reading "user; and" should read: --user;--.

In Claim 3:

Column 6, Lines 25-26, reading "wherein the scene relevant scene-relevant codes" should read: --wherein the scene-relevant codes--.

In Claim 7:

Column 6, Line 41, reading "device is a smartphone, at least one of the following" should read: --device is at least one of the following--.

Signed and Sealed this  
Fifth Day of August, 2025

Coke Morgan Stewart  
*Acting Director of the United States Patent and Trademark Office*